(No Model.)
R. W. HALE.
RECIPROCATING SCRAPER FOR BAND SAW WHEELS.
No. 571,876. Patented Nov. 24, 1896.
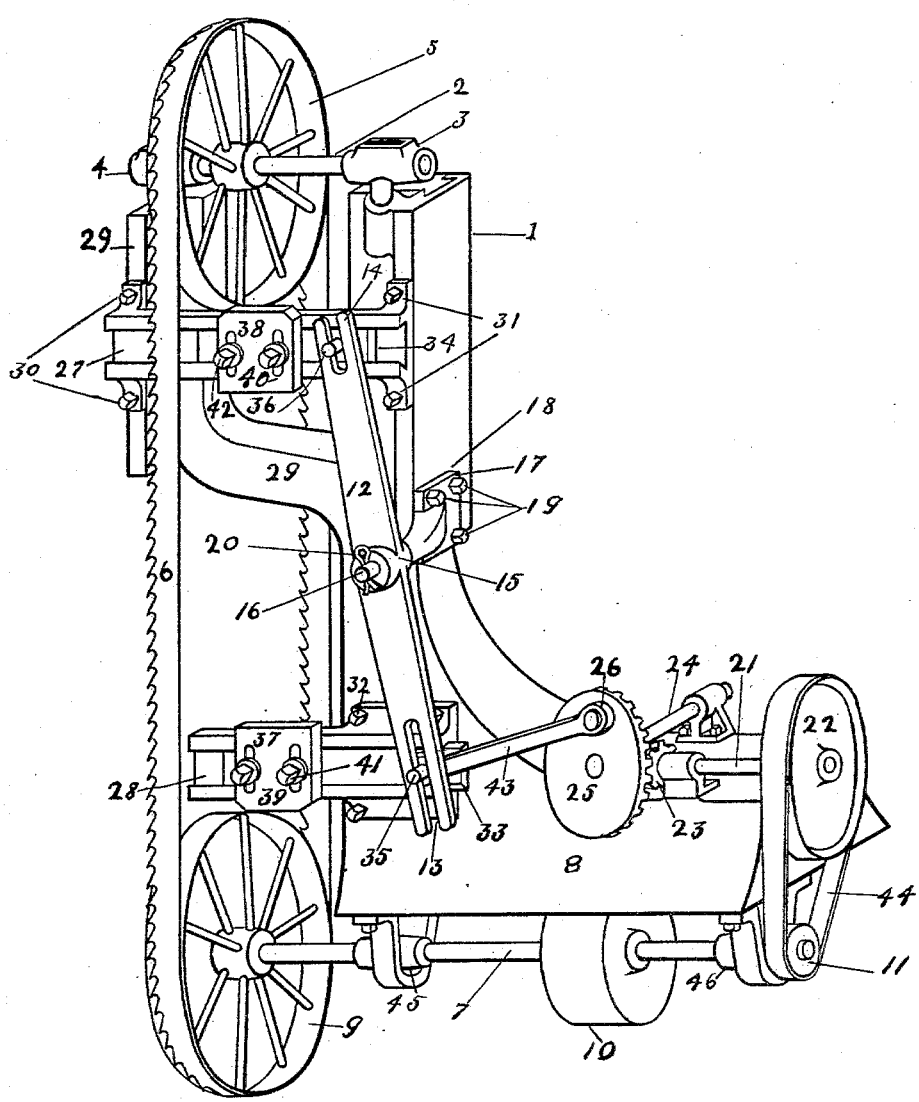
Witnesses:
Ada Gregg
H. B. Lauden
Roswell W Hale
Inventor.
By John A Gregg
Attorney.

UNITED STATES PATENT OFFICE.

ROSWELL W. HALE, OF WEST BAY CITY, MICHIGAN.

RECIPROCATING SCRAPER FOR BAND-SAW WHEELS.

SPECIFICATION forming part of Letters Patent No. 571,876, dated November 24, 1896.

Application filed May 11, 1896. Serial No. 591,059. (No model.)

*To all whom it may concern:*

Be it known that I, ROSWELL W. HALE, a citizen of the United States, residing at West Bay City, in the county of Bay and State of Michigan, have invented certain new and useful Improvements in Reciprocating Scrapers for Band-Saw Wheels; and I do hereby declare the following to be a full, clear, and exact description of the invention, such as will enable others skilled in the art to which it appertains to make and use the same.

My invention relates to improvements in reciprocating scrapers for band-saw wheels; and it consists in the combination, arrangement, and construction of the parts with the object of producing a device for scraping accumulated sawdust from the faces of the wheels which will reciprocate thereon, whereby uneven wear is greatly avoided on the wheel-faces from any unevenness that may occur on the edges of the scrapers.

Another object of the invention is to provide a reciprocating band-saw-wheel scraper which will be readily adapted to any band-saw mill.

Reference is to be had to the accompanying drawing, forming a part of this specification, in which similar figures of reference indicate corresponding parts in the illustration, which is a perspective elevation of the same.

1 represents a vertical band-saw column, which is of any ordinary form or design, and 2 is the upper shaft, which is journaled to the upper end of the same by means of journal-bearings 3 and 4, secured thereto by any usual means. 5 is the upper wheel, which supports the upper part of the band-saw, which is mounted on and secured to the upper shaft 2, and 6 is the band-saw, which has its upper part placed thereon.

7 represents the lower shaft, which is journaled to the base 8 by means of journal-boxes 45 and 46, which are secured to the lower side of the base in any usual manner.

9 is the lower wheel, which supports the lower part of the saw, and this wheel is secured on the front extended end to the lower shaft 7, which also has the saw placed thereon.

10 represents a belt-wheel for the purpose of applying power to the mill, and 11 is a pulley which connects the scraping device therewith.

12 represents a lever which is provided with bifurcated ends, as shown at 13 and 14, and a journal-bearing 15 at its midway.

16 is a journal which is provided with a flanged end 17, and this flanged end is secured to the column at 18 by means of bolts, as shown at 19, and has its journal end 16 projected beyond the column to a sufficient distance to admit the journal-bearing 15 to be slid thereon, and held in position by means of a cotter-pin 20, which is inserted through a hole provided in the extended end of the journal 16 and secured therein.

21 represents a shaft which is journaled by any usual means to the upper side of the base 8, and this shaft is provided with a band-wheel 22 on its rear extended end, and its opposite end provided with a miter gear-wheel 23, which is secured thereon.

24 is a shaft which is placed at right angles with a shaft 21, and is also journaled to the upper side of the base 8 by any usual means; and this shaft 24 is also provided with a miter-gear-wheel 25 on its end, which gears into a miter gear-wheel 23 and connects the same thereby, and on the outer face of this miter wheel 25 is provided a wrist-pin 26, for a purpose to be presently explained.

27 represents an upper slideway, and 28 is a lower slideway, and these slideways are placed at right angles with the saw-wheels. The upper slideway 27 is placed near the face of the saw-wheel 5, with one of its ends resting against the mill-column and its opposite end resting against the brace 29, where it is secured in position by means of bolts, as shown at 30 and 31. The lower slideway 28 has one of its ends placed against the mill-column, with its opposite end extended over the face of the saw-wheel 9, and is secured thereto by means of bolts, as shown at 32.

33 and 34 are slides which are provided with pintles 35 and 36, and these slides are inserted into the slideways 27 and 28 with their pintles projecting outward, and the bifurcated ends of the lever 12 are placed astride thereof.

37 and 38 are scrapers which are provided with slotted holes, as shown at 39 and 40, and these scrapers are placed with their scraping edges resting against the face of the saw-wheels and are secured in position by means of stud-bolts, as shown at 41 and 42, which are inserted through the slotted holes and screwed into the slides 33 and 34, and these slotted holes serve for adjusting the scrapers to the saw-wheels, whereby means is provided to keep them in proper position.

43 represents a reciprocating connecting-rod, which has one of its ends connected to the miter gear-wheel 25 by means of the wrist-pin 26, and has its opposite end interposed between the bifurcated end 13 of the lever 12 and the slide 33 and journaled to the inner end of the pintle 35.

By connecting the pulley 11 and the wheel 22 by means of a band 44 reciprocating movement is given to the lower slide 33, which actuates the lever 12, and to the upper slide 34, whereby means are provided for scraping the sawdust from the saw-wheel faces, which will not cause the faces of the wheels to become uneven or ridgy by any unevenness that may occur on the edges of the scrapers.

Of course it will be understood that the most important feature of the invention is the means for reciprocating the scrapers against the faces of the saw-wheels, and it will be understood that while I have described and illustrated a miter-gear connected thereto other means, however, can be used and produce the same effect. For instance, connecting the lower shaft 7 and the shaft 24 by means of a quarter-twist belt would give practically the same results, so that I do not therefore limit my invention to the precise construction and means herein described and shown for accomplishing this purpose.

Having thus described my invention, what I claim, and desire to secure by Letters Patent, is—

1. In reciprocating scrapers for band-saw mills, the combination of the wheels 5, and 9, the lever 12, said lever provided with bifurcated ends and a journal-bearing at its midway, the journal 16, for journaling the said lever thereon, the slides 33, and 34, and the slideways 27, and 28, and means for scraping the faces of the said wheels 5, and 9, substantially as described.

2. In reciprocating scrapers for band-saw mills, the combination of the lever 12, said lever provided with bifurcated ends and a journal-bearing at its midway, the saw-wheels 5, and 9, the journal 16, the slides 33, and 34, the slideways 27, and 28, and the scrapers 37, and 38, and means for actuating the same substantially as described.

3. In reciprocating scrapers for band-saw mills, the combination of the band-saw wheels 5, and 9, the slideways 27, and 28, secured to the column of a band-saw mill, and the bolts for securing it thereto the slides 33, and 34, provided with pintles 35, and 36, the scrapers 37, and 38, provided with slotted holes and the stud-bolts 41, and 42, the said scrapers secured to the said slides by means of the said stud-bolts, the lever 12, provided with bifurcated ends and a journal-bearing provided at its midway; the journal 16, said journal provided with a flange 17, the said flange secured to the column of the band-saw mill and the bolts for securing the same, the said lever journal-bearing slid on the said journal with its bifurcated ends placed astride of the said pintles, and the cotter-pin 20, for securing it on the said journal substantially as described.

4. In reciprocating scrapers for band-saw mills, the combination of the band-saw wheels 5, and 9, the lever 12, provided with bifurcated ends and a journal-bearing at its midway, the slides 27, and 28, said slides secured to the column of a band-saw mill, and the bolts for securing it thereto, the slides 33, and 34, provided with pintles 35, and 36, and the scrapers 37, and 38, provided with slotted holes, and the stud-bolts 41, and 42, the said scrapers secured to the said slides by inserting the said bolts through the said slotted holes and screwed into the said slides, the journal 16, said journal provided with a flanged end 17, said flanged end secured to the column of a band-saw mill, and the bolts for securing it thereto, and the cotter-pin 20, the said lever journal-bearing slid on the said journal with its bifurcated ends astride of the said pintles and secured by the said cotter-pin, the reciprocating connecting-rod 43, the miter gear-wheel 25, provided with a wrist-pin 26, and its shaft 24, the said reciprocating rod having one end journaled to the lower pintle and its opposite end connected to the said wrist, the miter-wheel 23, and its shaft 21, the band-wheel 22, the pulley 11, and the belt 44, for driving the same substantially as described.

In testimony whereof I affix my signature in presence of two witnesses.

ROSWELL W. HALE.

Witnesses:
ADA GREGG,
JOHN A. GREGG.